United States Patent Office 2,833,844
Patented May 6, 1958

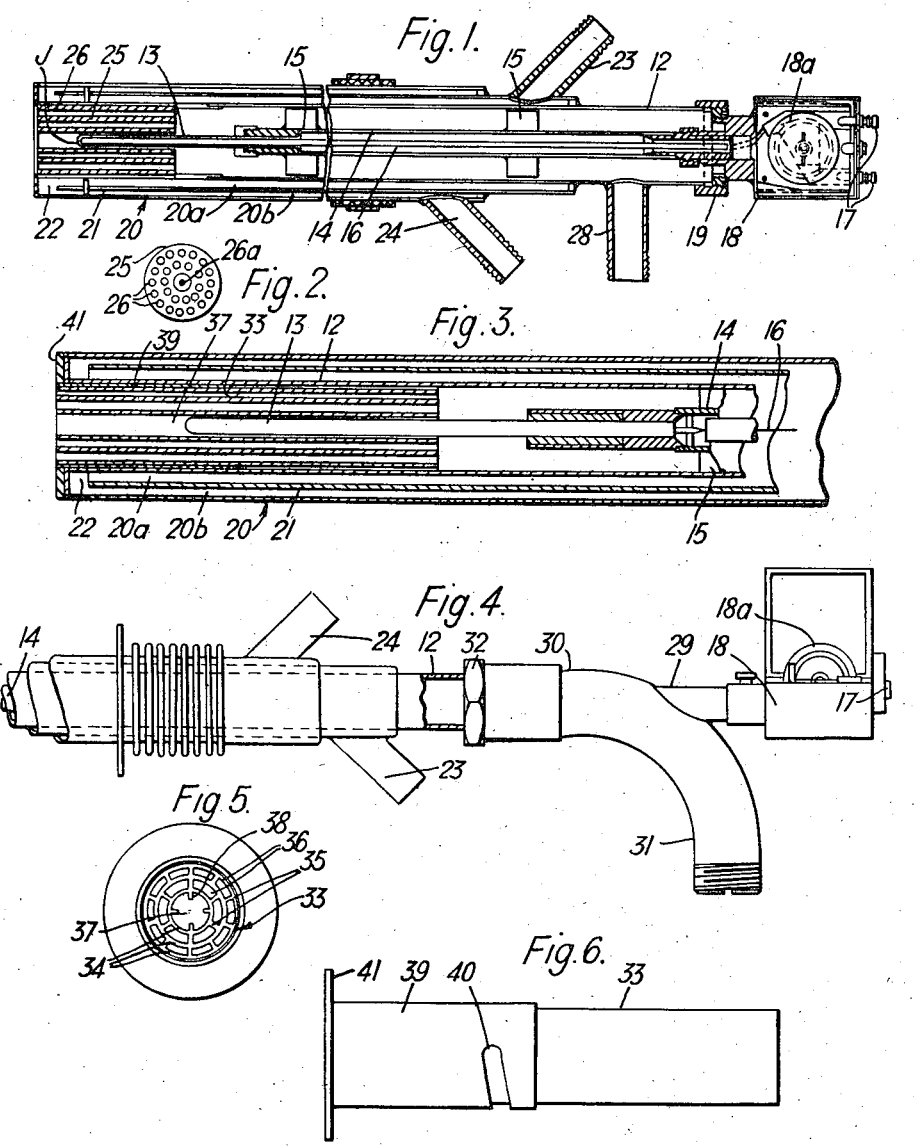

2,833,844

MEASUREMENT OF TEMPERATURES

Eric John Burton, London, and Reginald Mayorcas, Sheffield, England, assignors to Land Pyrometers Limited, Sheffield, England, a British company Application July 13, 1955, Serial No. 521,819

Claims priority, application Great Britain July 20, 1954

3 Claims. (Cl. 136—4)

This invention relates to the measurement of temperatures and in particular relates to the measurement of high temperatures of gases such as the combustion air in open hearth furnaces.

High gas temperatures are usually measured by a suction pyrometer which employs a thermocouple mounted in a tube through which is drawn the gas, the temperature of which is to be measured. In such pyrometers the thermocouple reaches a temperature between that of the gas and that of the surroundings, which are usually the furnace walls. The temperature difference between the gas and the thermocouple can be reduced by increasing the rate of flow of the gas and by reducing the heat transfer by radiation between the thermocouple and the surroundings. For the latter purpose, it has previously been proposed to surround the thermocouple with one or more radiation shields, which must be made of refractory material for high temperature measurements, but such shields have been unprotected, and, being fragile are easily destroyed by mechanical or thermal shock, or in open hearth furnaces are damaged by slag attack and excessive temperature during the waste gas cycle.

In accordance with the present invention, a suction pyrometer for the measurement of gas temperatures has its thermocouple and a surrounding refractory radiation shield mounted within a sleeve adapted to be water-cooled. In this way, the radiation shield is largely protected against overheating, slag attack, and mechanical shock.

In spite of the much larger difference in temperature between the gas being drawn past the thermocouple and the cooled surroundings of the shield, as compared with a pyrometer having the shield exposed to the hot furnace walls, the pyrometer according to the invention operates with adequate precision, because the relative coolness of the outside of the radiation shield makes for high efficiency by reason of the much lower rate of heat transfer between cool surfaces than between hot surfaces. Moreover, since the surroundings of the radiation shield are at a fixed temperature, any small residual error of the pyrometer should be of constant value, independent of the variable temperature of the furnace walls, and capable of being allowed for in calibration.

The water-cooling may be conveniently effected by means of a water-jacket surrounding a main tube in the forward end of which the refractory shield is contained. The jacket advantageously extends not only over the length of the main tube containing the shield, but also over the remaining part of the tube that is also exposed to the high temperature of the furnace walls when in use. The jacket is preferably double, an inner passage being connected to the water inlet and an outer return passage being connected to the water outlet.

The shield may consist of a ceramic block with a central lengthwise passage to receive the usual thermocouple sheath, and parallel passages surrounding the central passage, there being at least two such passages everywhere between the central passage and the outside of the block. Advantageously, the lengthwise passages may be formed by the shield consisting of thin concentric tubes with lengthwise partitions. The innermost tube may have lengthwise ribs within which the thermocouple sheath lies.

The invention will now be described in greater detail with reference to the accompanying drawing, in which:

Figure 1 is a longitudinal section through one form of pyrometer;

Figure 2 is an end view of the radiation shield used in the pyrometer of Figure 1;

Figure 3 is a longitudinal section of the thermocouple end of a somewhat modified pyrometer;

Figure 4 is a front elevation of the other end of the pyrometer of Figure 3, to a slightly smaller scale;

Figure 5 is an end view (to a larger scale) of the radiation shield used in the pyrometer of Figures 3 and 4; and Figure 6 is a front elevation of the shield of Figure 5.

In Figures 1 and 2, the pyrometer is of general tubular shape and comprises a main tube 12 at the forward end of which is mounted a thermocouple sheath 13 supported by an inner tube 14, located centrally in the tube 12 by support vanes 15. Thermocouple wires 16 pass through the tube 14 and the sheath 13 to the hot junction J from terminals 17 mounted on a reel box 18. The box is secured to the tube 12 by a nut 19 and contains a pair of reels 18a each carrying a reserve of each wire 16 forming one part of the thermocouple. When it is necessary to renew the thermocouple wire in the hot zone near to the thermojunction J, more wire 16 is drawn off the reels 18a to enable the junction to be remade.

Round the forward part of the tube 12 is attached a waterjacket 20, separated into inner and outer paths 20a, 20b by a partition 21, the two paths being interconnected at the forward end 22. An inlet tube 23 supplies passage water to the inner path 20a and the outer path 20b discharges by an outlet 24.

At the forward end of the tube 12 and within the jacket 20 is located a refractory radiation shield 25 consisting of a refractory block having a large number of cylindrical passages 26 of small diameter surrounding and parallel to a central axial passage 26a containing the forward end of the sheath 13 (see Figure 2).

At the rear end of the pyrometer, an outlet pipe 28 is secured in the tube 12 for connection to a source of suction so that gas from the furnace is drawn through the passages in the refractory block 25 and passed over the sheath 13. The pipe 28 and all air passages in the pyrometer to the rear of the block 25 are made as wide as possible to keep the pressure drop in the pyrometer to a minimum.

As the refractory shield 25 is protected by the water jacket 20, it is subject less to attack by hot or corrosive gases than in previous known pyrometers; and if the suction to the pipe 28 is switched off during the waste gas cycle of the open hearth furnace, the pyrometer can be used to measure the temperature of the preheated combustion air without any fear of damage by slag attack or excessive temperature during the waste gas cycle. In addition, the jacket 20 protects the shield against breakage due to mishandling of the pyrometer on installation in or removal from the furnace. Also, any cracking or breaking of the shield for this reason or other reason, such as the thermal shock when the hot gases are first sucked through it, does not necessarily result in the shield being rendered useless since the parts are held together by the surrounding water jacket.

In Figures 3 and 4, the reel box 18 is carried by a tube 29 emerging in line with the axis of the main tube 12 through a bend 30 in a suction connection 31, which is connected to the main tube 12 by a union 32. Apart from this difference, which eliminates the nut 19 of Figure 1 for connecting the reel box to the main tube, the main members 12 to 24 of Figures 3 and 4 are equivalent to the similarly designated parts of Figure 1.

The radiation shield 33 of Figure 3 is somewhat different. As shown in Figure 5, it consists of three thin concentric refractory tubes 34 with lengthwise partitions 35 forming passages 36 parallel to the axis of the central space 37, where the thermocouple shield 13 (Figure 3) lies within lengthwise ribs 38 from the innermost tube 34. The shield 33 is carried by a tubular holder 39 (extending partway only from the outer end of the shield, as shown in Figure 6), which holder fits within the tube 12, to which it is connected by a bayonet slot 40. When the holder 39 is fully inserted and connected, an end flange 41 bears against the end of the water jacket 20, the end of the radiation shield being flush with the front of the whole pyrometer.

With the thin walls of the tubes of the shield 33 of Figure 3 made possible by the good mechanical support given to the shield by the surrounding water jacket, and with the high gas velocity through the shield made possible by the smooth bend 30 of the suction connection 31 of Figure 4, the centre of the shield rapidly assumes a temperature of the order of that of the gas and the response time of the hot junction J within the sheath 13 is short, say of the order of 90 seconds.

The two forms of refractory shield described above are given purely by way of example; any arrangement of refractories forming a sufficient number of separate lengthwise passages for the gas round a central passage for the thermocouple shield 13 may be used. The shields may be readily replaced when damaged.

The shield of Figures 3 and 5 may be used instead of the shield of Figures 1 and 2, and vice versa.

With a gas velocity of 500 ft./sec. in the passages of the radiation shield, it has been found that the thermocouple reaches a temperature within 1 percent of the true temperature of the gas, if the gas temperature does not exceed about 1200° C. At higher temperatures a small correction may be necessary for very accurate work, but, on account of the constant temperature of the surroundings of the radiation shield, the value of this small correction is independent of the temperature of the furnace walls, and the pyrometer can be used up to 1400° C. or to higher temperatures if the radiation shield is made of a sufficiently refractory material.

What we claim is:

1. A suction pyrometer for the measurement of gas temperature, comprising a tube with a suction connection at one end, the tube being open at the other end, a refractory radiation shield wholly within that other end of the tube with a lengthwise bore, a sheathed thermocouple hot junction located in the bore in the shield, with clearance for gas drawn into the open end of the tube to pass round the thermocouple in the bore, passages in the refractory shield surrounding and parallel to the bore in the shield for the further passage of gas drawn into the open end of the tube, and a water-jacket surrounding the part of the tube containing the passaged shield and the hot junction of the thermocouple.

2. A suction pyrometer for the measurement of gas temperature, comprising a tube with a suction connection at one end, the tube being open at the other end, a refractory radiation shield wholly within that other end of the tube, the shield consisting of thin concentric tubes with lengthwise partitions, the innermost tube constituting a central bore, a sheathed thermocouple hot junction located in the central bore, with clearance for gas drawn into the open end of the tube to pass round the thermocouple in the bore, as well as gas passing between the concentric tubes, and a water-jacket surrounding the part of the tube containing the passaged shield and the hot junction of the thermocouple.

3. A suction pyrometer as in claim 2, wherein the central bore has lengthwise, inwardly projecting ribs within which the thermocouple sheath lies, the ribs forming lengthwise passages for the gas passing through the bore round the thermocouple sheath.

References Cited in the file of this patent
UNITED STATES PATENTS

| | | |
|---|---|---|
| 1,615,451 | Harrison | Jan. 25, 1927 |
| 1,849,832 | Herzog et al. | Mar. 15, 1932 |
| 2,291,448 | Bragg | July 28, 1942 |
| 2,534,448 | Jantsch | Dec. 19, 1950 |
| 2,669,593 | Larsen | Feb. 16, 1954 |

FOREIGN PATENTS

| | | |
|---|---|---|
| 191,712 | Great Britain | July 5, 1923 |